No. 793,922. PATENTED JULY 4, 1905.
I. DEUTSCH.
DEVICE FOR GRIPPING WHEELS TO AXLES.
APPLICATION FILED MAY 25, 1904.

Witnesses.
J. J. McCarthy.
Am Gillman Jr.

Inventor.
Isidor Deutsch
by Foster Freeman Watson
Attys.

No. 793,922. Patented July 4, 1905.

UNITED STATES PATENT OFFICE.

ISIDOR DEUTSCH, OF MONTREAL, CANADA, ASSIGNOR TO ELECTRIC AND TRAIN LIGHTING SYNDICATE, LIMITED, OF MONTREAL, CANADA, A CORPORATION OF CANADA.

DEVICE FOR GRIPPING WHEELS TO AXLES.

SPECIFICATION forming part of Letters Patent No. 793,922, dated July 4, 1905.

Application filed May 25, 1904. Serial No. 209,690.

*To all whom it may concern:*

Be it known that I, ISIDOR DEUTSCH, a citizen of the United States of America, residing at Montreal, in the district of Montreal, in the Province of Quebec, Canada, have invented certain new and useful Improvements in Devices for Gripping Wheels to Axles, of which the following is a specification.

My invention relates to improvements in devices for gripping wheels to axles; and the object of the invention is to devise a means of fixedly securing a driving-wheel on a rotating axle which shall be simple to use and cheap to manufacture and whereby the axle will in no way be damaged or affected by the application or subsequent removal of the wheel; and it consists, essentially, of a wheel having a sleeve extending therefrom surrounding said axle, said sleeve having a recess from its inner wall and a hole registering with said recess, a grip-block having a corrugated inner face located in said recess and a wedge-block inserted in said hole for retaining the grip-block in position against the taper of the axle, the various parts being constructed and arranged in detail, as hereinafter more particularly described.

Figure 1:
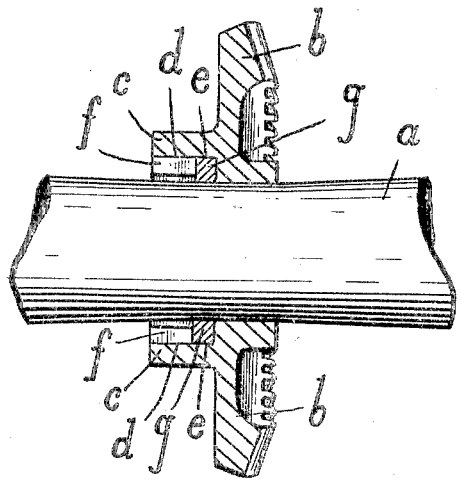
Figure 2:
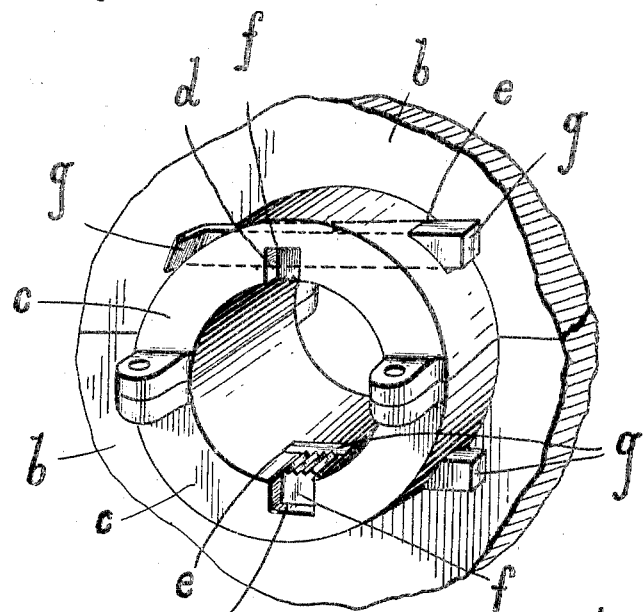

Figure 1 is a sectional view of a wheel gripped by my device to a tapered axle. Fig. 2 is an enlarged perspective view of my gripping device.

Like letters of reference indicate corresponding parts in each figure.

$a$ is an axle, preferably tapered toward the center from each side, as customary in the forming of railway-car-wheel axles.

$b$ is a wheel, preferably split in two sections, though for convenience the parts will be considered as integral throughout the following description. The wheel $b$ is mounted on the axle $a$ and the sections securely bolted together.

$c$ is a sleeve, preferably forming part with the wheel and extending from the hub thereof and surrounding the axle $a$.

$d$ represents recesses in the inner wall of the sleeve $c$ and preferably diametrically opposite one to the other.

$e$ represents holes intersecting the sleeve $c$ at a tangent and passing through the inner ends of the recesses $d$.

$f$ represents grip-blocks having toothed inner surfaces abutting the axle $a$ and located in the recesses $d$.

$g$ represents wedge-blocks inserted in the holes $e$ to wedge the grip-blocks $f$ against the taper of the axle. It will be thus seen that the tighter the wedges are forced in the greater grip the blocks $f$ will take, and consequently the firmer hold the wheel will have on the axle, as the sleeve $c$ is a part with the wheel or very securely attached thereto.

The wheel may be removed quite as readily as it is put on, and the facility with which a change may be made is a point much appreciated by mechanics.

What I claim as my invention is—

In a device of the class described, the combination with an axle tapered toward the center from each side, of a wheel having a sleeve extending therefrom surrounding said axle, said sleeve having a recess from its inner wall and a hole through said sleeve registering with said recess, a grip-block having a toothed inner face located in said recess, and a wedge-block entering said hole, and retaining said grip-block against the taper of the axle, as and for the purpose specified.

Signed at Montreal, in the district of Montreal, in the Province of Quebec, Canada, this 23d day of May, 1904.

ISIDOR DEUTSCH.

Witnesses:
J. E. L. BLACKMORE,
W. P. KING.